United States Patent [19]

Van de Venne

[11] Patent Number: 4,674,842

[45] Date of Patent: Jun. 23, 1987

[54] PICTURE DISPLAY CELL

[75] Inventor: Joannes L. M. Van de Venne, Eindhoven, Netherlands

[73] Assignee: U.S. Philips Corporation, New York, N.Y.

[21] Appl. No.: 759,998

[22] Filed: Jul. 29, 1985

[30] Foreign Application Priority Data

Aug. 14, 1984 [NL] Netherlands ............... 8402498

[51] Int. Cl.$^4$ ............... G02F 1/13; C09K 19/56
[52] U.S. Cl. ............... 350/340; 252/299.4
[58] Field of Search ............... 252/299.4; 350/339 R, 350/340

[56] References Cited

U.S. PATENT DOCUMENTS

| | | | |
|---|---|---|---|
| 3,728,008 | 4/1973 | Allan et al. | 350/340 |
| 3,867,015 | 2/1975 | Iida et al. | 350/340 |
| 4,151,326 | 4/1979 | Funada et al. | 252/299.4 |
| 4,165,922 | 8/1979 | Morrissy | 350/341 |
| 4,316,041 | 2/1982 | Totten et al. | 252/299.4 |
| 4,357,374 | 11/1982 | Ogawa | 350/340 |
| 4,370,028 | 1/1983 | Bernhardt | 350/340 |
| 4,437,731 | 3/1984 | Sudo et al. | 350/340 |

FOREIGN PATENT DOCUMENTS

| | | | |
|---|---|---|---|
| 54-49155 | 4/1979 | Japan | 350/340 |
| 57-08522 | 1/1982 | Japan | 350/340 |
| 57-42019 | 3/1982 | Japan | 350/340 |
| 57-177121 | 10/1982 | Japan | 252/299.4 |

Primary Examiner—Teddy S. Gron
Assistant Examiner—J. E. Thomas
Attorney, Agent, or Firm—Norman N. Spain

[57] ABSTRACT

Picture display cell having a liquid crystalline compound provided between two substrate plates comprising at their inner surfaces electrodes and a monolayer of a monofunctional silane compound with which a homeotropic orientation of the liquid crystalline compound is obtained.

3 Claims, 3 Drawing Figures

PICTURE DISPLAY CELL

BACKGROUND OF THE INVENTION

The invention relates to a picture display cell which comprises a liquid crystalline compound provided between two substrate plates provided on their inner surfaces with an electrode and an orientation layer which gives the liquid crystalline compound a homeotropic orientation.

The surface of the inner wall of the substrate employed in such a display cell must comprise hydroxyl groups and be provided, for example, with a layer of quartz ($SiO_2$) or a metal oxide, for example, $TiO_2$ over the electrode(s). The substrate is usually manufactured from glass and on its inner surface has a layer of $SiO_2$ provided over the electrode(s) by means of a chemical vapour deposition process.

Such a picture display cell has been used frequently in a variety of apparatuses and products in the past few years.

For various types of liquid crystal displays, a homeotropic orientation of the liquid crystalline compound with respect to the substrate is necessary. With a homeotropic orientation the molecules of the liquid crystalline compound have a preferential position which is perpendicular to the surface of the substrate. A homeotropic orientation is necessary inter alia for liquid crystal displays with dynamic scattering, ECB (electrically controlled birefringence) and cholesteric-nematic phase transitions.

In order to obtain a homeotropic orientation, the substrate is often treated with a bi- or trifunctional silane compound. There are compounds which per molecule have two or three active atoms or groups which can react with the substrate and thus produce a bonding. Examples of such compounds are methyltrichlorosilane and methylphenyldichlorosilane. The chlorine atoms react with the hydroxyl groups present on the substrate. Instead of chlorosilane compounds, alkoxysilane compounds may also be used, for example, dimethylbisethoxysilane and methyltriethoxysilane. These substances are less reactive than the chorosilanes and must be employed in an aqueous medium in which the alkoxy groups are converted into hydroxyl groups which react with the hydroxyl groups on the substrate.

The disadvantage of the use of the above-mentioned bi- and trifunctional silanes is that the surface of the resulting orientation layer is not accurately defined, so that the orientation of the liquid crystalline compound is not optimal. The poor definition of the orientation layer in applicants' opinion is caused by polymerisation taking place in the presence of moisture. As a result of the polymerisation, the surface of the orientation layer is not uniform. Moreover, active OH-groups are created in the orientation layer and from adsorption sites for constituents of the layer of the liquid crystalline compound.

BRIEF DESCRIPTION OF THE INVENTION

It is the object of the invention to provide an orientation layer in liquid crystalline displays, the surface of which is well defined and uniform and which orientation layer furthermore provides an improved homeotropic orientation of the liquid crystalline compound. A further object is to reach a good, improved population density of the orientation layer with respect to the substrate surface.

According to the invention, these objects are achieved by means of a display cell of the type mentioned in the opening paragraph which is characterized in that the orientation layer is a mono layer obtained by using a compound which satisfies the formula I

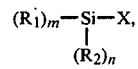

wherein
$R_1$ is an alkyl group or a cycloalkyl group having at least 4 carbon atoms, which group may be substituted with fluorine,
$R_2$ is an alkyl group with 1–3 carbon atoms or a cyclopropyl groups, which group may be substituted with fluorine,
X is a halogen atom or an alkoxy group having 1–2 carbon atoms,
m has the value 1–3
n has the value 0–2, and
m+n=3.

In this connection it is to be noted that on page 12, last paragraph, of the German Offenlegungsschrift No. 2,312,662 a monofunctional silane, namely trimethylethoxysilane, is also mentioned in addition to various bi- and trifunctional silane monomers. However, this substance does not give a homeotropic orientation to a liquid crystalline compound. The same applies to the substance trimethylchlorosilane mentioned in U.S. Pat. No. 4,165,922 which produces a random orientation in a liquid crystalline medium. By treating a substrate with trimethylchlorosilane, the same orientation layer is obtained as by the treatment with the trimethoxysilane described in the above-mentioned German Patent Specification.

DETAILED DESCRIPTION OF THE INVENTION

In a preferred form of the invention the silane compound satisfies formula II

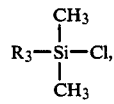

in which formula $R_3$ is an alkyl group or a cycloalkyl group having at least 8 carbon atoms. Examples of excellently active silane compounds are octyldimethylchlorosilane, dodecyldimethylchlorosilane, and decyldimethylethoxysilane.

When a silane compound is used comprising one long alkyl group having four or more carbon atoms and two short alkyl groups, for example, methyl groups, a comparatively high population density is reached. Depending on the length of the long alkyl group, a population density of 30–70%, for example, 40%, is reached. This means that of the five hydroxyl groups per 100 Å of an SiO₂ substrate, two hydroxyl groups have reacted with the silane compound.

Figure 2:
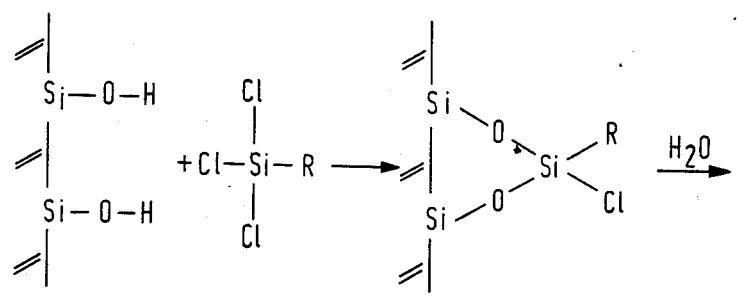
FIG. 2 shows schematically the reaction of a trifunctional silane of the prior art and the hydroxyl groups of a $SiO_2$ substrate and a subsequent polymerization reaction and
FIG. 3 shows schematically the reaction of a silane of the invention and the hydroxyl group of an $SiO_2$ substrate and the subsequent reaction with trimethylchlorosilane.
Figure 2:
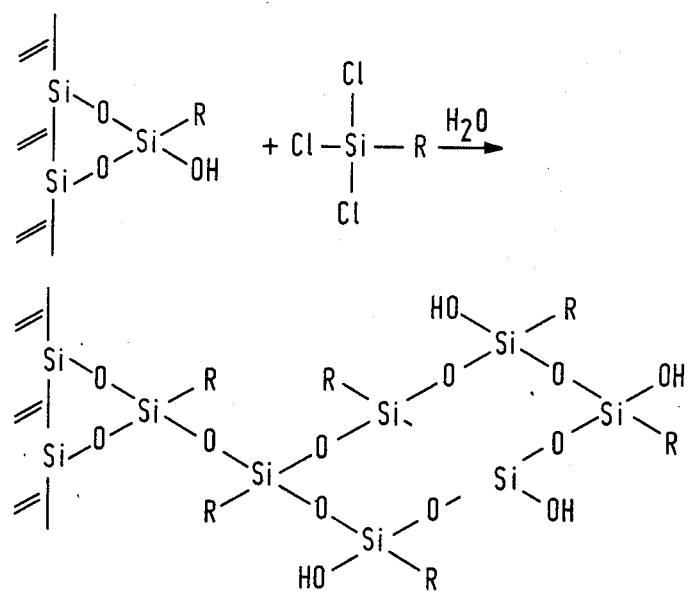

The reaction of the silane compound used according to the invention with the hydroxyl groups of an SiO₂ substrate are shown in FIG. 2 of the drawing in which R is an organic group such as methyl or methylphenyl.

As indicated, according to the invention, a monomolecular orientation layer is obtained which does not comprise any active groups any longer, apart from the remaining hydroxyl groups on the substrate.

Figure 3:
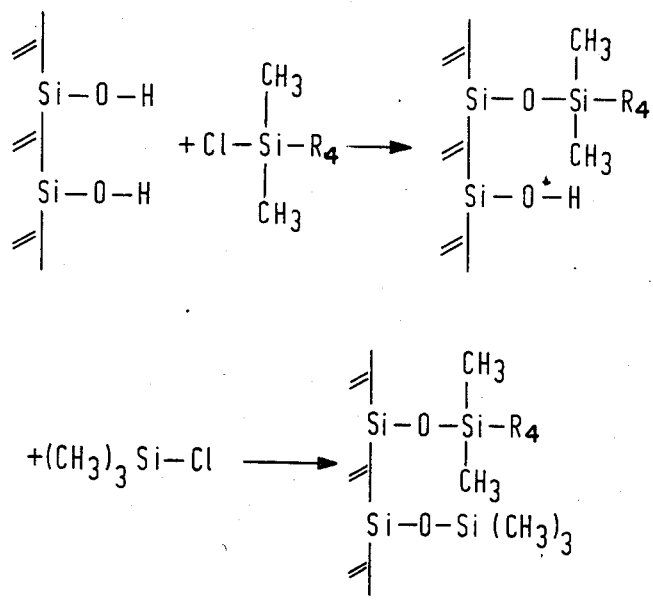

In a further preferred form of the invention, after using a compound of formula I or II, the substrate is post-treated with trimethylchlorosilane. The latter substance has small dimensions. As a result, this substance can penetrate between the long alkyl chain of a compound of formula I or II, reach the surface and react with the hydroxyl groups still present on the substrate, as shown in FIG. 3 of the drawing in which R is an organic group an defined for $R_1$ and $R_3$. The uniformity of the surface is increased by this treatment and as a result of this the quality of the homeotropic orientation is promoted.

The orientation layer of the silane compound may be provided on the substrate in various ways.

For example, the surface of the substrate provided with an electrode may be contacted with the vapour of the silane compound.

The silane compound may also be provided on the substrate from a solution. For this purpose, in the case of a silane compound which comprises a halogen atom, the compound is dissolved in an apolar organic solvent, for example, toluene, hexane or benzene. The concentration is, for example, from 0.1 to 1% by volume. A basic catalyst, for example, an amine, is added to the solution. An example of a suitable catalyst is pyridine in a concentration of 0.1% by volume. The solution may be provided on the substrate by a spraying process. Alternatively, the substrate may be dipped in the solution. After this treatment the substrate is rinsed, first with, for example, toluene and then with a polar solvent, for example, an alcohol, so as to remove the polar reaction products and notably the pyridine-HCl salt formed.

A solution of a silane compound with an alkoxy group may also be used. The solvent must comprise water or be water. As a result of this the alkoxy-silane compound is hydrolysed to a hydroxysilane compound which has a sufficient reactivity with respect to the hydroxyl groups on the substrate.

The invention will be described in greater detail with reference to FIG. 1 of the drawing which is a cross-sectional view of a picture display cell according to the invention.

Figure 1:
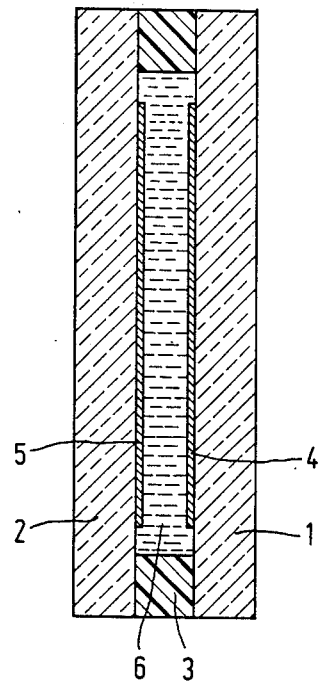
FIG. 1 is a cross-sectional view of a picture display cell according to the invention.

Reference numerals 1 and 2 in FIG. 1 denote two parallel glass plates. The plates are connected together at their edges by means of a ring 3. Transparent electrodes 4, 5 manufactured, for example, from indium oxide or tin oxide, are provided on the inner surface of the plates 1 and 2. A liquid crystalline medium 6 is present in the space bounded by the plates 1,2 and the ring 3.

The glass plates 1,2 with the electrodes 4,5, prior to their assembly with the ring 3 to form the picture display cell shown in FIG. 1, have first been treated with a silane compound. For this purpose the glass plates are immersed in a solution of n-octyldimethylchlorosilane in toluene. The quantity of n-octyldimethylsilane is 0.5% by volume. Pyridine in a quantity of 0.1% by volume is added to the solution. The solution is refluxed for 5–30 minutes. The glass plates are removed from the solution and rinsed in toluene.

The glass plates thus treated are again immersed in a solution of a silane compound in toluene. The silane compound used is trimethylchlorosilane in a quantity of 0.5% by volume. The solution comprises 0.1% by volume of pyridine. The solution is boiled and then cooled. The plates are removed and rinsed successively with toluene, and ethanol.

The orientation layer obtainted in this manner was a well defined monolayer. The liquid crystalline medium present in the picture display cell shown in the Figure showed a perfect homeotropic orientation. Examples of liquid crystalline substance used are: biphenyl compounds, for example, 4-cyano-4'-n-pentylbiphenyl; phenyl cyclohexane compounds, for example, 1-cyano-4-(n-propylcyclohexyl)-benzene; azoxybenzene compounds, for example, 4,4'-di-n-propylazoxybenzene; cyclohexanebiphenyl compounds, for example, 4-cyano-4'-n-propylcyclohexylbiphenyl; phenylbenzoates, for example, 4-propyl-4'-butoxy-phenylbenzoate; phenyl-cyclohexanecarboxylates and cyclohexyl-cyclohexanecarboxylates.

What is claimed is:

1. A picture display cell which comprises a liquid crystalline compound provided between two substrate plates provided on their inner surfaces with an electrode and an orientation layer which gives the liquid crystalline compound a homeotropic orientation, characterized in that the orientation layer is a monolayer obtained by using a compound which satisfies formula I

wherein
$R_1$ is an alkyl group or a cycloalkyl group having at least 4 carbon atoms, which group may be substituted with fluorine,
$R_2$ is an alkyl group having 1–3 carbon atoms or a cyclopropyl group, which group may be substituted with fluorine,
X is a halogen atom or an alkoxy group having 1–2 carbon atoms,
m has the value 1–3
n has the value 0–2, and
m+n=3.

2. A picture display cell as claimed in claim 1, characterized in that the compound satisfies formula II

wherein $R_3$ is an alkyl group or a cycloalkyl group having at least 8 carbon atoms.

3. A picture display cell as claimed in claim 1 or 2, characterized in that after using a compound of formula I, an after-treatment is carried out with trimethylchlorosilane.

* * * * *